United States Patent
Drexl et al.

(10) Patent No.: US 10,995,603 B2
(45) Date of Patent: May 4, 2021

(54) INTELLIGENT CORE-DRILLING END DETECTION

(71) Applicant: Hilti Aktiengesellschaft, Schaan (LI)

(72) Inventors: Tobias Drexl, Weil (DE); Andreas Hartig, Augsburg (DE); Thomas Schmalholz, Kaufbeuren (DE); Bernhard Link, Schwabbruck (DE); Goran Golubovic, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/569,267

(22) PCT Filed: Apr. 22, 2016

(86) PCT No.: PCT/EP2016/059011
§ 371 (c)(1),
(2) Date: Oct. 25, 2017

(87) PCT Pub. No.: WO2016/173940
PCT Pub. Date: Nov. 3, 2016

(65) Prior Publication Data
US 2018/0119536 A1    May 3, 2018

(30) Foreign Application Priority Data
Apr. 28, 2015   (EP) .................... 15165312

(51) Int. Cl.
*E21B 43/00*   (2006.01)
*E21B 44/00*   (2006.01)
(Continued)

(52) U.S. Cl.
CPC ............ *E21B 44/005* (2013.01); *B23B 49/00* (2013.01); *B23B 51/0406* (2013.01);
(Continued)

(58) Field of Classification Search
CPC combination set(s) only.
See application file for complete search history.

(56) References Cited

U.S. PATENT DOCUMENTS 5,349,337 A * 9/1994 McCormick ....... G05B 19/4166
340/680
8,257,002 B2  9/2012 Prust et al.
(Continued)

FOREIGN PATENT DOCUMENTS

DE   10 2007 053 350 A1   5/2009
DE   10 2011 080 374 A1   2/2013
(Continued)

OTHER PUBLICATIONS

PCT/EP2016/059011, International Search Report dated Jun. 17, 2016, (Two (2) pages).

*Primary Examiner* — Cathleen R Hutchins
*Assistant Examiner* — Ronald R Runyan
(74) *Attorney, Agent, or Firm* — Crowell & Moring LLP (57) ABSTRACT

A control method for using a core drilling system is disclosed. In an embodiment the method includes detecting a predetermined drilling situation on the basis of the attainment of a predetermined threshold value for at least one predetermined corresponding drilling parameter and ending the core drilling operation by selecting a reverse-travel mode for removing the drilling tool from the borehole if the advancing device does not reach a predetermined threshold value for a predetermined corresponding distance value in a direction and the core drilling machine does not reach a predetermined threshold value for at least one predetermined corresponding drilling parameter or continuing the core drilling operation by selecting a predetermined operating mode if the advancing device reaches a predetermined threshold value for a predetermined corresponding distance value in a direction and the core drilling machine reaches a
(Continued)

predetermined threshold value for at least one predetermined corresponding drilling parameter.

4 Claims, 5 Drawing Sheets

(51) Int. Cl.
  *B23B 51/04* (2006.01)
  *B28D 1/04* (2006.01)
  *B23B 49/00* (2006.01)
  *B28D 7/00* (2006.01)

(52) U.S. Cl.
  CPC .............. *B28D 1/041* (2013.01); *B28D 7/005* (2013.01); *B23B 2226/75* (2013.01); *B23B 2260/0482* (2013.01); *B23B 2260/128* (2013.01); *B23B 2270/32* (2013.01); *B23B 2270/483* (2013.01); *B23B 2270/486* (2013.01); *B23B 2270/54* (2013.01)

(56) References Cited

U.S. PATENT DOCUMENTS

2004/0253064 A1* 12/2004 Koslowski .............. B23B 39/00
  408/1 R
2010/0296886 A1   11/2010 Prust et al.

FOREIGN PATENT DOCUMENTS

| | | |
|---|---|---|
| DE | 11 2013 000 138 T5 | 1/2016 |
| EP | 0 997 801 A2 | 6/2000 |
| EP | 1 607 186 A1 | 12/2005 |
| SU | 1442974 A1 | 12/1988 |
| SU | 1479632 A1 | 5/1989 |

* cited by examiner

INTELLIGENT CORE-DRILLING END DETECTION

This application claims the priority of International Application No. PCT/EP2016/059011, filed Apr. 22, 2016, and European Patent Document No. 15165312.8, filed Apr. 28, 2015, the disclosures of which are expressly incorporated by reference herein.

BACKGROUND AND SUMMARY OF THE INVENTION

The present invention relates to a control method for using a core-drilling system containing a core drilling machine with a drilling tool for producing a borehole in a material and an advancing device for driving the core drilling machine along a machine-holding device.

Moreover, the invention relates to an advancing device for driving a core drilling machine along a machine-holding device for using the method according to the invention.

In addition, the invention relates to a core drilling machine for using the method according to the invention.

The invention also relates to a core drilling system containing a core drilling machine and an advancing device for driving the core drilling machine along a machine-holding device for using the method according to the invention.

The quality of a mineral material, e.g., concrete, sandstone, masonry or similar, in which a borehole is supposed to be cut using a core-drilling system, is rarely completely homogenous in its structural construction. In other words: in addition to concrete reinforcing bars (also referred to as reinforcing steel, rebar, reinforcing bars) cavities, gaps and/or intermediate layers of isolating or damping material are frequently also found in the mineral material. These intermediate layers usually have a lower thickness than the mineral material whereby these are essentially softer than the mineral material.

The cavities, gaps and intermediate layers of isolating or damping material found in the mineral material pose a significant problem for the core drilling systems or for core drilling machines. As soon as a core drilling tool designed as a drill bit impacts a cavity, a gap or an intermediate layer in the mineral material, the core drilling system wrongly expects based on the corresponding change to certain drilling parameters that material is no longer present for cutting and the core drilling system considers the core drilling operation completed.

Such a situation is designated as a "breakthrough" of the mineral material. The user of the core drilling system must then re-start the core drilling operation until, or so frequently until, all the material has really been cut. This significantly prolongs the entire core drilling operation.

There is a further problem with core drilling systems according to the prior art in that a distinction can either not be made at all or only very inaccurately between certain situations which may occur during the actual core drilling operation. Certain drilling situations such as, for example, impacting a pre-selected stopping device (depth stop) on the machine-holding device, an undesired blocking of the advancing device, reaching a pre-selected drilling depth or weakening of the cutting function of the drill bit segments (so-called polishing of the drill bit), substantially require immediate ending of the drilling operation and removal of the drill bit from the borehole.

However, conventional core drilling systems disadvantageously do not make a distinction between reaching cavities, gaps and intermediate layers of isolating or damping material located in the mineral material, the existence of a breakthrough in the material to be processed or the existence of one of the previously mentioned drilling situations.

The fact that the core drilling system does not recognize or make this distinction leads to a significant prolonging of the entire core drilling operation.

The object of the present invention is to provide a control method for using a core drilling system containing a core drilling machine and an advancing device for driving the core drilling machine along a machine-holding device by means of which the previously described problems can be solved and a core drilling operation can be designed more quickly and efficiently. The object of the present invention is also to provide an advancing device for driving a core drilling machine along a machine-holding device, a core drilling machine and a core drilling system containing a core drilling machine and an advancing device for driving the core drilling machine along a machine-holding device for using the method by means of which the previously described problems can be solved and a core drilling operation can be designed more quickly and efficiently.

A control method is therefore provided for using a core drilling system containing a core drilling machine with a drilling tool for producing a borehole in a material and an advancing device for driving the core drilling machine along a machine-holding device.

According to the invention, the method contains the steps:
detecting a predetermined drilling situation on the basis of the attainment of a predetermined threshold value for at least one predetermined corresponding drilling parameter;
ending the core drilling operation by selecting a reverse-travel mode for removing the drilling tool from the borehole if the advancing device does not reach a predetermined threshold value for a predetermined corresponding distance value in a direction (C) and the core drilling machine does not reach a predetermined threshold value for at least one predetermined corresponding drilling parameter; or
continuing the core drilling operation by selecting a predetermined operating mode if the advancing device reaches a predetermined threshold value for a predetermined corresponding distance value in a direction (C) and the core drilling machine reaches a predetermined threshold value for at least one predetermined corresponding drilling parameter.

A distinction can be hereby made between the cavities, gaps and intermediate layers of isolating material or damping material located in the mineral material and a breakthrough. The control method according to the invention can also distinguish between the previously described drilling situations such as, for example, impacting a pre-selected stopping device (depth stop) on the machine-holding device, an undesired blocking of the advancing device, reaching a pre-selected drilling depth or weakening of the cutting function of the drill bit segments.

The predetermined drilling situation may for example be impacting a pre-selected stopping device (depth stop) on the machine-holding device, an undesired blocking of the advancing device by a foreign body, reaching a pre-selected drilling depth and/or dulling or weakening of the cutting function of the drill bit segments (so-called polishing of the drill bit).

According to an advantageous embodiment of the present invention, it is useful for the drilling parameter to correspond to a rotational speed value of a drive of the core drill machine, a torque value generated by the drive and transferred to the drilling tool or to a current strength value of the drive.

According to an advantageous embodiment of the present invention, it is possible for the drilling parameter to correspond to a rotational speed value of an advancing drive, a torque value generated by the advancing drive or to a current strength value of the advancing drive.

According to an additional embodiment of the present invention, it may be advantageous for the predetermined threshold value to correspond to a predetermined percentage portion of the corresponding drilling parameter.

The invention is explained further with regard to advantageous exemplary embodiments.

DETAILED DESCRIPTION OF THE DRAWINGS

Figure 1:
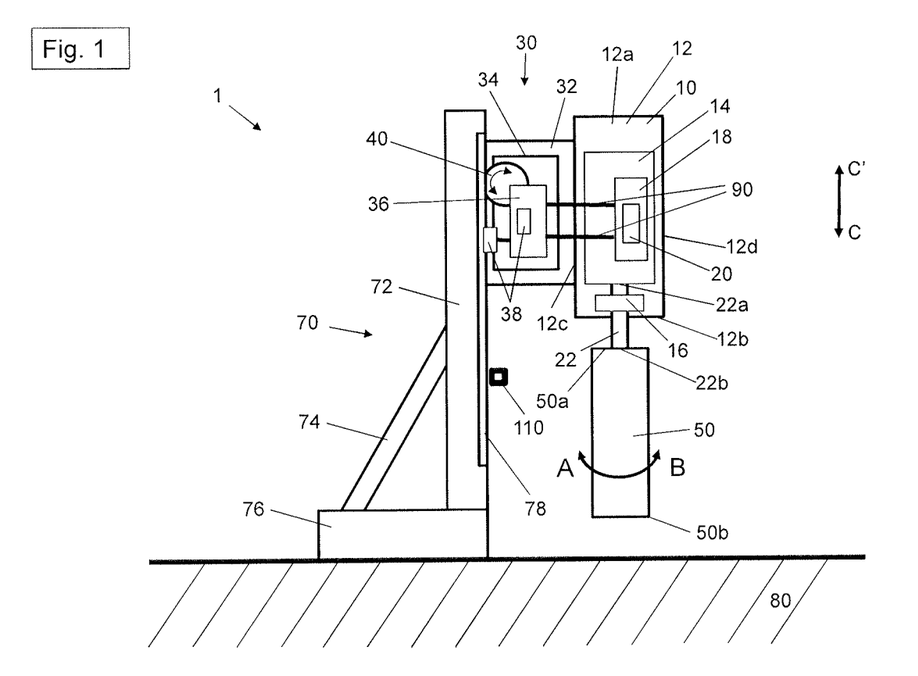
FIG. 1 illustrates a core drilling system according to the invention with a core drilling machine, an advancing device and a machine-holding device in an initial position.

FIG. 1 shows a core drilling system 1 as an assembly of a power tool 10, an advancing device 30, a drilling tool 50 in the form of a drill bit and a machine-holding device in the form of a machine stand 70.

The power tool 10 is designed in the form of a core drilling machine and contains a housing 12, a drive 14, a gear mechanism 16, a first control unit 18, sensors 20 and a drive shaft 22. The drive 14 is designed in the form of an electromotor. Alternatively, any other suitable drive type can also be selected.

According to a special embodiment of the present invention, the drive 14 can be formed by a high frequency motor.

The first control unit 18 is designed such that it detects all parameters of the power tool 10 and in particular all parameters of the drive 14, which are measured by the sensors 20 of the power tool 10. These parameters include for example the engaged gear of the gear mechanism 16, the rotational speed of the electromotor 14, the torque generated by the electromotor 14, the rotational speed of the drilling tool 50, the applied and/or output power of the electromotor 14, the applied current strength of the electromotor 14, etc.

The housing 12 has an upper side 12a, a lower side 12b, a left side 12c and a right side 12d. The drive 14 is located in the inside of the housing 12.

The drive shaft 22 has a first end 22a and a second end 22b. The first end 22a of the drive shaft 22 is connected to the drive 14 such that the drive 14 designed as an electromotor can move the drive shaft 22 into a first rotational movement A or second rotational movement B. The second end 22b of the drive shaft 22 protrudes at the lower side 12b of the housing 12 from the core drilling machine 10. The drilling tool 50 also has a first end 50a and a second end 50b in the form of a cylindrical drill bit. The first end 50a of the drilling tool 50 is connected in a torque-proof manner to the second end 22b of the drive shaft 22. The power tool 10 can move the drilling tool 50 into the first rotational movement A or into the second rotational movement B via the drive shaft 22.

The advancing device 30 contains a housing 32 in which an advancing drive 34, a second control unit 36, sensors 38 and a drive pinion 40 are positioned. The second control unit 36 is designed such that it detects all parameters of the advancing device 30 and in particular the parameters of the advancing drive 34, which are measured by the sensors 38 of the advancing device 30. These measured parameters include for example the advancing speed of the advancing device 30 to the machine stand 70 or the workpiece 80, the distance of the advancing device 30 already travelled since the start of the drilling operation measured from a start point to be defined (also referred to as zero point), the position of the advancing device 30 along the machine stand 70, the angle of rotation of the advancing drive 34, etc.

A number of parameters of the control unit 36 of the advancing device 30 can also be calculated. The parameter calculation in this case takes place on the basis of a comparison between the parameters detected by the sensors 38, such as, for example, the angle of rotation of the drive pinon 40 and the predefined (i.e., preset) parameters. The advancing speed of the advancing device 30 to the machine stand 70, the relative and/or absolute position of the advancing device 30, the distance of the advancing device 30 already travelled since the start of the drilling operation and the time and/or distance until the impact of the drilling tool 50 is reached can inter alia be determined from the parameter calculation.

The advancing drive 34 is in this case, as shown in FIG. 1, according to a first embodiment designed in the form of an electromotor.

The advancing drive 34 drives the drive pinon 40 and thus the advancing device 30 relative to the machine stand 70 with the control of the control unit 36.

The advancing device 30 is designed such that it can be mounted on the machine stand 70 (as described below) and can be moved using the drive pinion 40 along the machine stand 70 in the direction of arrow C. The sensors 38 are in the form of angle, rotational speed, acceleration, speed or position sensors and are in this case designed such that they detect the acceleration, the advancing speed, the angle, the angle of rotation and the position of the advancing device 30 either incrementally directly on the advancing drive 34 or absolutely along the machine stand 70.

The machine stand 70 contains a guide rail 72, a bracing element 74 and a base plate 76. The guide rail 72 is positioned on the base plate 76 and supported by the bracing element 74 such that the guide rail 72 is aligned vertically or at a predefined angle. The guide rail 72 also has a toothed rack 78 on one side. The bracing element 74 is in this case optional and can also be left out according to one alternative embodiment of the machine stand.

As also illustrated in FIG. 1, the housing 12 of the power tool 10 is fastened to the housing 32 of the advancing device 30.

The advancing device 30 is mounted on the machine stand 70 such that the drive pinon 40 of the advancing device 30 engages into the toothed rack 78 of the machine stand 70. If the drive pinon 40 is moved into a rotational movement under the control of the control unit 36 of the advancing drive 34, the advancing device 30 is moved reversibly along the machine stand 70 in the direction of arrow C or C'. As the power tool 10 is fastened to the advancing device 30, the power tool 10 is also moved along the machine stand 70 in the direction of arrow C by moving the advancing device 30 along the machine stand 70 in the direction of arrow C. The drilling tool 50, fastened on the power tool 10, in the shape of the cylindrical drill bit is advanced vertically into the workpiece 80 to be processed, i.e., advanced into the substrate by moving the power tool 10 vertically, whereby a hole is drilled into the workpiece 80. The material 80 is in this case configured as mineral material, in particular as concrete with concrete reinforcing bar 81.

Figure 3:
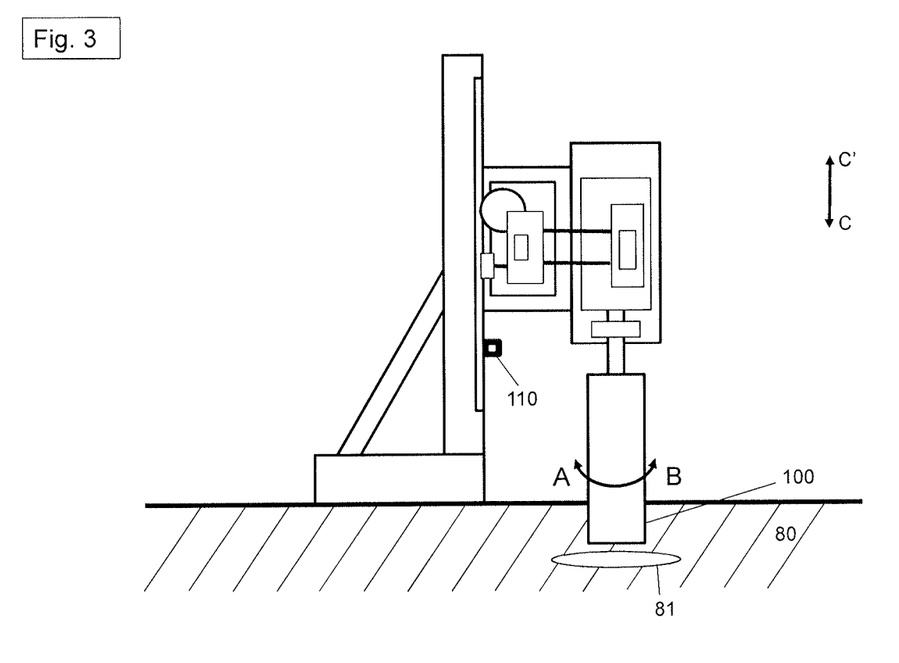
FIG. 3 illustrates the core drilling system according to the invention with the core drilling machine, the advancing device and the machine-holding device with a drill bit in the mineral material.

As already previously described, the respective sensors 38 of the advancing device 30 measure the parameters of the advancing device 30. The respective sensors 20 of the power tool 10 also measure the parameters of the power tool 10. As illustrated in FIG. 3, the advancing device 30 and the power tool 10 are connected to each other by connection elements 90 in such a way that all detectable parameters of the advancing device 30 can be sent to the power tool 10 and all detectable parameters of the power tool 10 can be sent to the advancing device 30. There is thus bidirectional communication between the advancing device 30 and the power tool 10. Owing to this bidirectional communication, it is inter alia possible for the advancing device 30 to be started and put into operation for example via a start switch, not shown, on the power tool 10.

It is also in particular possible for the information flow, i.e., the bidirectional transfer of the parameters between the advancing device 30 and the power tool 10, to take place via a power cable not shown. According to an advantageous embodiment, the bidirectional transfer of the parameters in this case takes place from the power cable via the power tool 10 to the advancing device 30.

Drilling Operation

As already described previously, a core drilling system 1 is schematically illustrated in FIGS. 1 to 5 and a core drilling operation for producing a borehole 100 in a mineral material 80 is illustrated with individual method steps.

The core drilling system 1 is illustrated in FIG. 1 at the start of a core drilling operation. The drill bit 50 is located for this purpose above in the direction C' over the material 80. In this case, the core drilling system 1 is operated with a spot-drilling mode. In the spot-drilling mode, the drive 14 operates the drill bit 50 in a predetermined spot-drilling rotational speed for rotating into the direction of rotation A or B. The spot-drilling rotational speed is dependent upon the diameter of the drill bit 50 used for the respective drilling operation. The greater the diameter of the selected drill bit, the lower the spot-drilling rotational speed in the spot-drilling mode.

Figure 2:
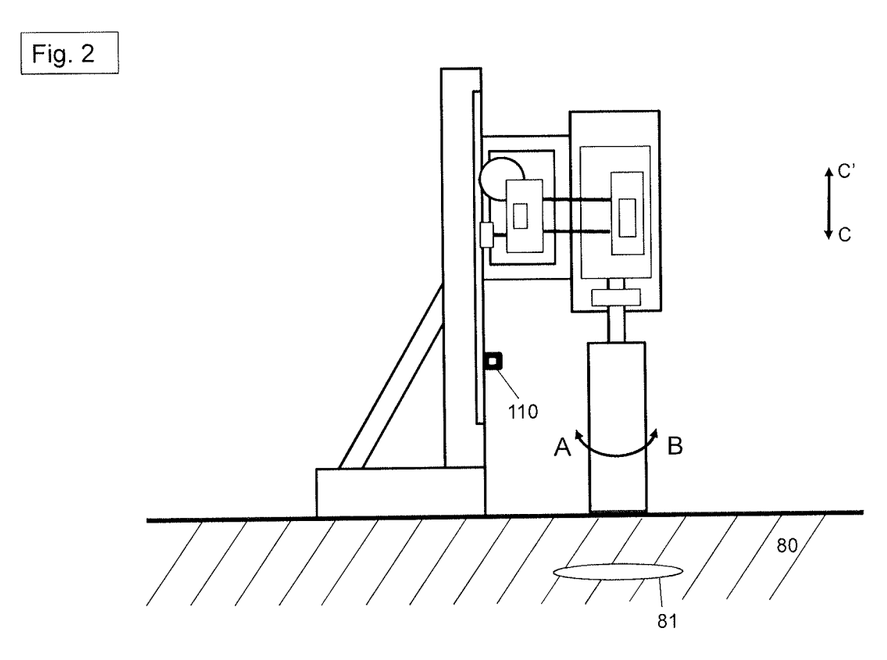
FIG. 2 illustrates the core drilling system according to the invention with the core drilling machine, the advancing device and the machine-holding device at the start of a core drilling operation into a mineral material.

As shown in FIG. 2, the drill bit 50, rotating in the spot-drilling mode with the spot-drilling rotational speed, is then moved towards the material 80 in the direction C by the advancing device 30. If the second end 50b of the drill bit 50 comes into contact with the material 80, the drill bit 50, in particular the blade segments of the drill bit 50 not illustrated starts to cut the material 80 and produce a borehole 100.

After the spot-drilling of the material 80 has concluded, i.e., a depth of around 20 mm has been cut into the material 80 in the direction C using the drill bit 50, the rest of the drilling operation for completing the borehole 100 starts. The depth of the spot-drilling is in this case dependent upon the respectively used drill bit 50 or the diameter of the drill bit 50. The core drilling system 1 is adjusted from the spot-drilling mode into a drilling mode for the rest of the drilling operation. For this purpose, the rotational speed of the drill bit 50 is increased from the relatively low spot-drilling rotational speed of the spot-drilling mode to the drilling speed of the drilling mode. With unchanged conditions and an unchanged consistency (i.e., hardness and thickness) of the mineral material 80, the drill bit 50 is rotated at this drilling speed of the drilling mode until the borehole 100 is completed and driven forward by the advancing device 30 in the direction C.

Different drilling situations can occur during the core drilling operation which can all interrupt or completely end the core drilling operation. The advancing device 30 can for example impact a stopping device 110 which is arranged at a predetermined position on the machine stand 70 and serves to not allow the advancing device 30 to continue to move in the direction C along the machine stand 70. The stopping device 110 can also be designated as the depth stop since it prevents the core drilling machine 10 and in particular the drill bit 50 from penetrating deeper into the mineral material 80 as the advancing device 30 impacts the stopping device 110 (see FIG. 5).

An undesired blockage of the advancing device 30 may also occur by a foreign body which leads to the advancing device 30 not being able to continue moving in the direction C along the machine stand 70. The foreign body may for example be a fixed object which is inadvertently located in the direction C below the advancing device 30 and against which the advancing device 30 impacts during the forwards movement such that it cannot continue to move along the machine stand 70 in the direction C.

It is also possible for the pre-selected drilling depth to be reached by the core drilling system 1 whereby the drilling operation is not continued. Prior to the start of the core drilling operation, the desired value for the drilling depth is input into the control unit 36 of the advancing device 30 such that when this drilling depth (i.e., distance in the direction C) has been reached, the advancing device 30 is stopped by the control unit 36.

In addition, it is also possible for the individual drill bit segments of the drill bit 50 to become dulled during the course of the drilling operation and consequently their cutting effect in the mineral material 80 weakens. In this case, no additional material is cut from the mineral material 80 such that further advancing of the drill bit 50 into the mineral material 80 can no longer be achieved. The drill bit 50 is in this case only rotated in the borehole 100 without advancing and downforce. This is also designated as "polishing" of the drill bit 50.

All these drilling situations can be detected based on a significant change of at least one drilling parameter by the sensors 20, 38 of the core drilling system 1 and based on a stoppage of the advancing device 30 along the machine stand 70. In other words: target values for drilling parameters are no longer achieved during the core drilling operation. In particular, the sensors 20, 38 detect that a predetermined threshold value for at least one predetermined corresponding drilling parameter is reached. The threshold value can in this case correspond to a percentage value of the corresponding drilling parameter. Thus the sensors 20, 38 can for example detect that the advancing speed of the advancing device 30 is significantly reduced or the advancing device 30 no longer generates an advancement in the direction C along the machine stand 70.

Moreover, an increase of the motor current strength of the drive 14 and a decrease of the torque generated by the drive 14 and transferred to the drill bit 50 is also detected. If the predetermined threshold value for the respectively corresponding drilling parameter is reached (i.e., threshold value is exceeded or undercut) and an advancement can no longer be registered by the advancing device 30 along the machine stand 70, the core drilling operation is concluded and a reverse-travel mode is selected to remove the drilling tool 50 from the borehole 100. To this end, the drill bit 50 is withdrawn from the borehole 100 by means of a return movement of the advancing device 30 in the direction C' along the machine stand 70.

The drill bit 50 can impact cavities, gaps or intermediate layers of isolating or damping material located in the mineral material 80 during the drilling operation. A breakthrough can also be produced through the mineral material 80.

The core drilling system 1 can distinguish on the basis of the control method according to the invention between cavities, gaps or intermediate layers of isolating or damping material, located in the mineral material 80, and a breakthrough.

Figure 4:
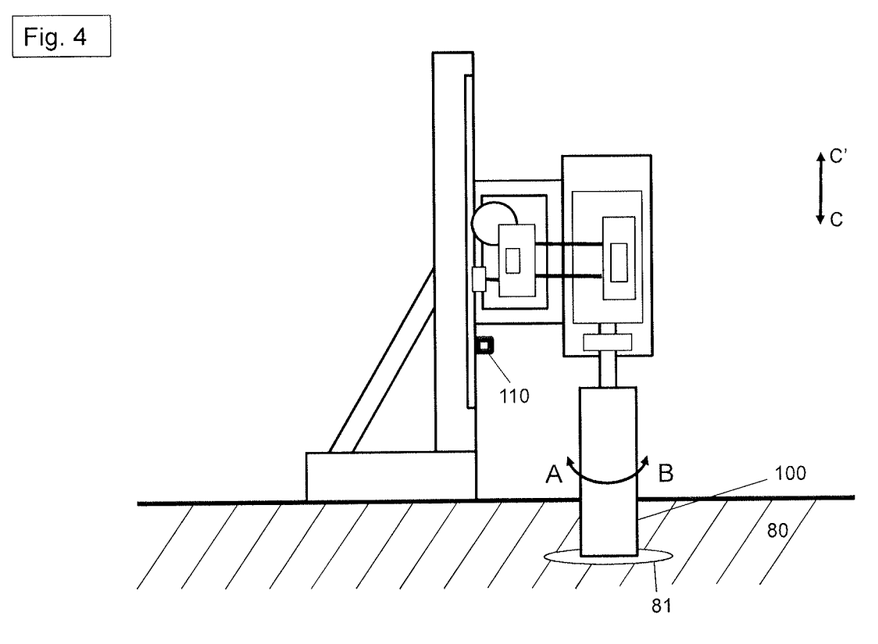
FIG. 4 illustrates the core drilling system according to the invention with the core drilling machine, the advancing device and the machine-holding device with the drill bit when it encounters a concrete reinforcing bar in the mineral material.
Figure 5:
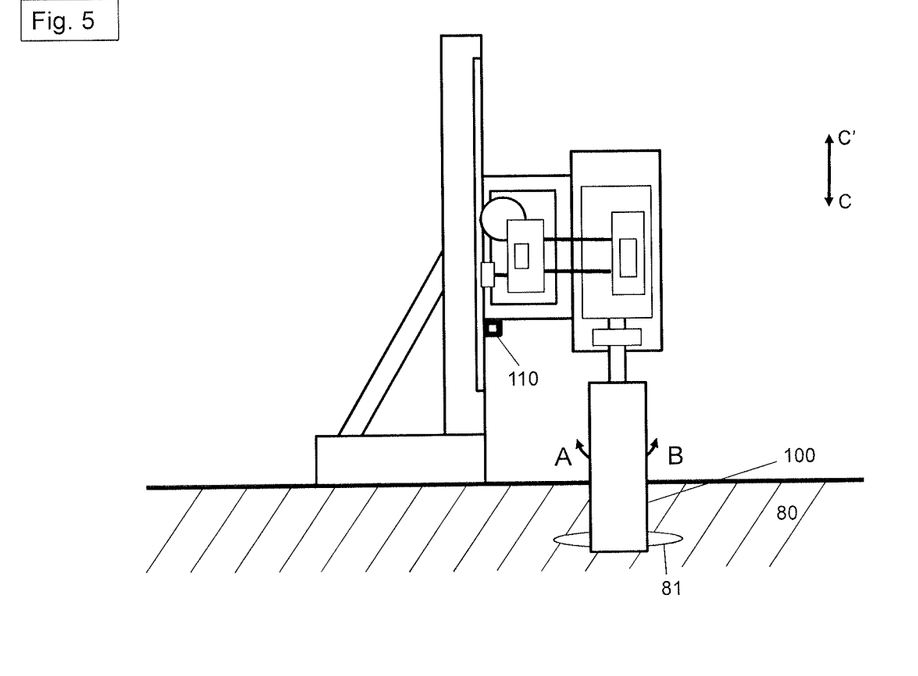
FIG. 5 illustrates the core drilling system according to the invention with the core drilling machine, the advancing device and the machine-holding device with the drill bit after cutting a concrete reinforcing bar in the mineral material.

In both cases (i.e., cavities, gaps, intermediate layers of isolating or damping material and breakthrough), a significant change of at least one drilling parameter is detected by the sensors 20, 38 of the core drilling system 1 as well as an additional advancement of the advancing device 30 along the machine stand 70. In particular, the sensors 20, 38 detect that a predetermined threshold value for at least one predetermined corresponding drilling parameter is reached. The threshold value can in this case correspond to a percentage value of the corresponding drilling parameter. In the present case where the drill bit 50 no longer cuts the hard mineral material 80, the sensors 20, 38 detect that the advancing speed of the advancing device 30 increases or the advancing device 30 generally continues to move in the direction C along the machine stand 70. A decrease of the motor current strength of the drive 14 and a decrease of the torque generated by the drive 14 and transferred to the drill bit 50 is also detected. To this end, the rotational speed value of the drive 14 increases. If the predetermined threshold value for the respectively corresponding drilling parameter is reached (i.e., the threshold value is exceeded or undercut) and the advancing device 30 continues to move along the machine stand 70, the sensors 20, 38 also detect how far (i.e., what distance) the advancing device 30 can still travel along the machine stand 70 in the direction C before at least one drilling parameter reaches a threshold value again, which can indicate drilling into the mineral material 50. In other words: if, after a distance of approx. 30 mm in the direction C, the sensors 20, 38 detect that the advancing speed of the advancing device 30 is reduced, the motor current strength of the drive 14 is increased, the torque generated by the drive 14 and transferred to the drill bit 50 is increased and the rotational speed value of the drive 14 is reduced, the core drilling system 1 can detect that the reason for the change of the at least one drilling parameter is merely because the drill bit 50 encountered a cavity, gap or intermediate layer of isolating or damping material located in the mineral material 80 and there is subsequently mineral material 80 to be cut.

The core drilling system 1 thus clearly detects that this is not a breakthrough in the mineral material 80.

As a result, the core drilling operation is continued with the corresponding drilling mode.

In contrast to this, the sensors 20, 38 no longer detect a corresponding change of the drilling parameters in the case of a breakthrough in the mineral material 80 after a predetermined distance of approx. 30 mm in the direction C which indicates that additional mineral material 80 is present for cutting after the predetermined distance. In other words: after the predetermined distance of approx. 30 mm in the direction C, the core drilling system 1 does not detect a reduction of the advancing speed of the advancing device 30, no increase of the motor current strength of the drive 14, no increase of the torque generated by the drive 14 and transferred to the drill bit 50 and no reduction of the rotational speed value of the drive 14.

As a result, the core drilling operation is concluded and a reverse-travel mode is selected for removing the drilling tool 50 from the borehole 100.

On the basis of the control method according to the invention, the core drilling system 1 can reliably and clearly distinguish between the existence of cavities, gaps or intermediate layers of isolating or damping material, located in the mineral material 80 and actual breakthroughs in the mineral material 80. The entire core drilling operation can thus be designed more quickly and efficiently.

The invention claimed is:

1. A control method for using a core drilling system that includes a core drilling machine with a drilling tool for generating a borehole in a material and an advancing device for driving the core drilling machine along a machine-holding device, comprising the steps of:
    performing a core drilling operation with the core drilling system and generating the borehole in the material by the core drilling operation;
    determining that a breakthrough in the material has not occurred during the core drilling operation when it is detected that an advancing speed of the advancing device is reduced, a motor current strength of a drive of the core drilling machine is increased, a torque generated by the drive and transferred to a drill bit of the drilling tool is increased, and a rotational speed value of the drive is reduced; or
    determining that a breakthrough in the material has occurred during the core drilling operation when it is not detected that the advancing speed of the advancing device is reduced, the motor current strength of the drive of the core drilling machine is increased, the torque generated by the drive and transferred to the drill bit of the drilling tool is increased, and the rotational speed value of the drive is reduced.

2. The control method according to claim 1 further comprising the step of continuing the core drilling operation when the breakthrough has not occurred.

3. The control method according to claim 1 further comprising the step of concluding the core drilling operation when the breakthrough has occurred.

4. The control method according to claim 3 further comprising the step of selecting a reverse-travel mode for the core drilling system and removing the drilling tool from the borehole.

* * * * *